United States Patent [19]
Noda et al.

[11] Patent Number: 6,013,305
[45] Date of Patent: Jan. 11, 2000

[54] PROCESSED MEAT PRODUCT AND PROCESS FOR PREPARING SAME

[75] Inventors: Minoru Noda, Chiba; Fumio Noda, Motofuchu-machi; Tetsuya Sugino, Ishikawa; Yoshito Sugino, Ishikawa; Mitsuo Takahashi, Tokyo, all of Japan

[73] Assignee: Sugiyo Co., Inc., Japan

[21] Appl. No.: 09/119,847

[22] Filed: Jul. 21, 1998

[30] Foreign Application Priority Data

Mar. 13, 1998 [JP] Japan .................................. 10-082551

[51] Int. Cl.$^7$ ...................................................... A23L 1/317
[52] U.S. Cl. ............................................. 426/644; 426/646
[58] Field of Search .................... 426/641, 643, 426/644, 646

[56] References Cited

U.S. PATENT DOCUMENTS

| | | | |
|---|---|---|---|
| 4,439,456 | 3/1984 | Kammuri et al. | 426/643 X |
| 4,579,741 | 4/1986 | Hanson et al. | 426/643 X |
| 4,806,378 | 2/1989 | Ueno et al. | 426/643 |
| 5,028,444 | 7/1991 | Tamamoto et al. | 426/643 X |
| 5,137,746 | 8/1992 | Kanayama et al. | 426/643 |
| 5,718,932 | 2/1998 | Nakao et al. | 426/643 X |

FOREIGN PATENT DOCUMENTS 6-169729  6/1994  Japan .

*Primary Examiner*—Arthur L. Corbin
*Attorney, Agent, or Firm*—Banner & Witcoff, Ltd.

[57] ABSTRACT

A food product having flavor, taste and mouthfeel like "chikuwa" and a low fat content is prepared by adding to an amount of chopped poultry or animal meat water in an amount of 40 to 100% by weight of the amount of the meat, an alkaline substance in an amount of 0.1 to 1.0% by weight of the amount of the meat, and a suitable amount of a seasoning and/or a spice; the mixture having been ground under a vacuum below 100 torr and formed into pieces of a desired shape, which have been heat-coagulated. A process for preparing the product is also provided.

8 Claims, No Drawings

PROCESSED MEAT PRODUCT AND PROCESS FOR PREPARING SAME

BACKGROUND OF THE INVENTION

This invention relates to a processed meat product made from a paste of poultry or animal meat, and a process for preparing the product.

In Japan it is well known in the processed food industry to prepare meat products from a paste of meat of such different kinds of fish as cod, lizard fish, croakers, sea eels, etc. by adding seasonings, spices, etc. to the meat of such fish, grinding the mixture to produce a paste of the fish meat, shaping the paste into tubular pieces, steaming, cooling and packaging the pieces. One of such processed seafood products is "chikuwa", which is made by molding a paste of fish meat around a cylindrical core, heat-coagulating the paste and removing the core to obtain a tubular piece of heat-coagulated paste.

In preparing such processed meat products as mentioned above, if the amount of water to be added to the meat paste is insufficient, the paste becomes too hard to be able to be subjected to shaping by an automatic shaping machine. If the amount of water is too much, it becomes difficult to shape the paste into pieces by the automatic shaping machine and the product becomes too soft to the touch in the mouth when eaten and loses the inherent flavor and taste of the meat material.

In view of the foregoing difficulty, Japanese Unexamined Patent Publication No. 6-169728 discloses a process for preparing a "chikuwa"-shaped processed meat product, wherein water is added to a meat in an amount of 20 to 40% by weight of the meat, and the mixture is kneaded with seasonings, spices and table salt, and shaped by an automatic shaping machine, steamed and cooled to produce "chikuwa"-shaped pieces of food.

The present inventors have conducted various studies and experiments to solve the above problem and prepare a "chikuwa"-like product which is low in fat content, and superior in taste, flavor and mouthfeel, and which can be easily formed by the use of an automatic "chikuwa"-forming machine even if the water content of the meat material exceeds 40% by weight thereof.

The experiments the inventors have conducted are as follows:

(1) The experiment conducted to test the effect of the amount of water added to the material on the plasticity thereof.

24 kg of chicken meat was chopped by means of a 6-mm blade and divided into 24 parts each consisting of 1 kg of the chopped chicken meat. To twelve of the 24 parts of chopped chicken meat was added water in amounts of 0, 10, 20, 30, 40, 50, 60, 70, 80, 90, 100 and 110% by weight, respectively, per 1 kg of the chicken meat, together with 2% by weight of table salt. Each of the 12 mixtures was ground by a food processor for 10 minutes to obtain a mass of paste or "surimi". Each of the 12 masses was formed by an automatic "chikuwa"-forming machine into a plurality of "chikuwa"-shaped pieces, which were baked by an electric baking machine and used as controls in the experiment.

To the remaining 12 parts of the chopped chicken meat was added water in amounts of 0, 10, 20, 30, 40, 50, 60, 70, 80, 90, 100 and 110% by weight, respectively, per 1 kg of the chicken meat, together with 2% by weight of table salt and 0.5% by weight of sodium carbonate. Each of the 12 mixtures was ground for 10 minutes by a food processor installed in a vacuum desiccator set to 35 torr to obtain a mass of paste or "surimi". Each of the 12 masses was formed by the automatic "chikuwa"-forming machine into a plurality of "chikuwa"-shaped pieces of chicken meat paste, which were baked by the baking machine and used as samples in the experiment.

Sensory tests were conducted on the samples and controls, with 10 persons as panelists. The results of the tests are given in Table 1.

TABLE 1

| Amount of water added (% by weight of the amount of meat) | | | | | | | |
|---|---|---|---|---|---|---|---|
| | 0 | 10 | 20 | 30 | 40 | 50 | 60 |
| Controls | Bad | Bad | Good | Good | Good | Bad | Bad |
| Samples | Bad | Bad | Good | Good | Good | Excellent | Excellent |
| | 70 | | 80 | | 90 | 100 | 110 |
| Controls | Bad | | Bad | | Bad | Bad | Bad |
| Samples | Excellent | | Excellent | | Good | Good | Bad |

In the table the evaluation "excellent" means that all of the 10 panelists felt the product had excellent flavor, taste, and mouthfeel. The evaluation "good" means that five to nine of the 10 panelists felt the product had good flavor, taste and mouthfeel, and the evaluation "bad" means that all of the 10 panelists felt the product had bad flavor, taste and mouthfeel.

In the controls, with less than 20% by weight of water the paste was too hard to be gelled. With more than 50% by weight of water, the paste was too soft to be formed into "chikuwa"-shaped pieces. In the samples, however, with 20 to 100% by weight of water it was possible to make a "chikuwa"-like product from the paste of chicken meat. In particular, with 50 to 80% by weight of water it was possible to obtain a "chikuwa"-like product having excellent flavor, taste and mouthfeel.

The tension strength of both the controls and samples was measured by means of a rheometer manufactured by Rheotec Co., Ltd., Japan. For the measurement, the product was cut into 2-mm thick annular slices. With the plunger of the rheometer inserted into the central hole of a slice, it was tensioned until it was broken. The tension strength was indicated by the load in terms of gram on the slice when it was broken. The results of the measurement are given in Table 2, wherein the term "Impossible" (abbreviated to "Imp.") means that the measurement was impossible.

TABLE 2

| Amount of water added (% by weight of the amount of meat) | | | | | | | | |
|---|---|---|---|---|---|---|---|---|
| | 0 | 10 | 20 | 30 | 40 | 50 | 60 | 70 |
| Controls | Imp. | Imp. | 510 | 650 | 500 | Imp. | Imp. | Imp. |
| Samples | Imp. | Imp. | 650 | 700 | 760 | 830 | 850 | 820 |
| | 80 | | 90 | | 100 | | 110 | |
| Controls | Imp. | | Imp. | | Imp. | | Imp. | |
| Samples | 800 | | 750 | | 600 | | Imp. | |

As in the sensory tests, the samples to which 20 to 100% by weight of water was added had a tension strength suitable for "chikuwa"-like processed food. In particular, the samples to which 50 to 80% by weight of water was added had higher levels of tension strength despite the high water content.

(2) The experiment to test the effect of alkali on the plasticity of the product.

9 kg of chicken meat was chopped by means of a 6-mm blade and divided into 9 parts each consisting of 1 kg of the chopped chicken meat. To each of the 9 parts of chopped chicken meat were added 60% by weight of water and 2% by weight of table salt per 1 kg of the meat. Further, to the 9 mixtures was added sodium carbonate in amounts of 0, 0.05, 0.1, 0.2, 0.4, 0.6, 0.8, 1.0 and 1.2% by weight, respectively. Each of the 9 mixtures was ground by the food processor installed in the desiccator set to a vacuum of 40 torr for 10 minutes to obtain a mass of paste or "surimi". Each of the 9 masses was formed by the automatic "chikuwa"-forming machine into a plurality of "chikuwa"-shaped pieces, which were baked by the electric baking machine.

Sensory tests were conducted on the product with 10 persons as panelists, and the tension strength of the product was measured. The results of the tests and measurement are given in table 3.

TABLE 3

Amount of $Na_2CO_3$ added (% by weight of the amount of meat)

|  | 0 | 0.05 | 0.10 | 0.20 | 0.40 | 0.60 |
|---|---|---|---|---|---|---|
| Evaluation | Bad | Bad | Good | Excellent | Excellent | Excellent |
| Tension strength (g) | Imp. | 500 | 650 | 710 | 800 | 860 |

|  | 0.80 | 1.00 | 1.20 |
|---|---|---|---|
| Evaluation | Excellent | Good | Bad |
| Tension strength (g) | 900 | 780 | 650 |

The samples to which sodium carbonate was added in amounts below 0.05 and above 1.20% by weight were inferior as a "chikuwa"-like processed food of chicken meat paste. The samples to which sodium carbonate was added in an amount between 0.1 to 1.0% by weight were superior in flavor, taste, and mouthfeel and in tension strength.

(3) The experiment to test the effect of vacuum on the plasticity of the product.

5 kg of chicken meat was chopped by means of a 6-mm blade and divided into 5 parts each consisting of 1 kg of the chopped chicken meat. To each of the 5 parts of chopped chicken meat were added 60% by weight of water, 2% by weight of table salt and 0.4% by weight of sodium carbonate. The 5 mixtures were ground by the food processor installed in the vacuum desiccator set to different degrees of vacuum at 10, 50, 100, 380 and 760 torr, respectively, for 10 minutes to obtain five (5) masses of paste or "surimi". Each of the 5 masses was formed by the automatic "chikuwa"-forming machine into a plurality of "chikuwa"-shaped pieces of chicken meat paste, which were baked by means of the electric baking machine.

Sensory tests were conducted on the product with 10 persons as panelists, and the tension strength was measured. The results of the tests and measurement are given in table 4.

TABLE 4

|  | Vacuum (torr) | | | | |
|---|---|---|---|---|---|
|  | 10 | 50 | 100 | 380 | 760 |
| Evaluation | Excellent | Excellent | Good | Bad | Bad |
| Tension strength (g) | 910 | 860 | 800 | 500 | Impossible |

The product obtained by grinding the material under a vacuum below 100 torr was superior in flavor, taste and mouthfeel and in tension strength.

Based on the results of the above experiments the present inventors have successfully achieved the object of the invention by adding to the material an alkaline substance within a particular range of amount and grinding the material under a vacuum within a particular range. The product prepared in accordance with the invention is superior in flavor, taste and mouthfeel and low in fat content despite a relatively large amount of water added to the material.

SUMMARY OF THE INVENTION

The method of the invention for preparing a "chikuwa"-like food product comprises providing an amount of animal meat, adding to the meat water in an amount between 40 and 100% by weight of the meat, an alkaline substance in an amount between 0.1 and 1.0% by weight of the meat, and a seasoning and/or spice in a suitable amount; grinding the mixture under a vacuum below 100 torr into a mass of meat paste; forming the mass into "chikuwa"-shaped pieces; and heat-coagulating the pieces.

The alkaline substance which may be used in accordance with the invention is selected from the group consisting of alkali metal hydroxides, alkaline earth metal hydroxides, alkali metal carbonates, alkaline earth metal carbonates, alkali metal hydrogencarbonates, alkaline earth metal hydrogencarbonates, alkali metal phosphates, alkaline earth metal phosphates, alkali metal polyphosphates, alkaline earth metal polyphosphates, alkali metal salts of organic acids, and alkaline earth metal salts of organic acids.

In accordance with the invention, to an amount of an animal meat such as pork, beef, chicken, mutton, etc. are added water in an amount between 40 to 100% by weight of the amount of the meat and an alkaline substance in an amount between 0.1 and 1.0% by weight of the amount of the meat and, if desired, an effective amount of table salt, sugar or other seasonings, and/or spices, and the mixture is ground under a vacuum below 100 torr for 5 to 15 minutes to obtain a mass of "surimi" or paste of the meat. The "surimi" thus prepared is formed by an automatic "chikuwa"-forming machine into "chikuwa"-shaped pieces, which are baked by a baking machine and cooled to produce a "chikuwa"-like processed food product of animal meat paste. The product is packed for sale in the market.

The amount of water to be added to the material meat ranges from 40 to 100% by weight and preferably from 50 to 80% by weight of the amount of the meat, and the amount of an alkaline substance to be added to the meat ranges from 0.1 to 1.0% by weight of the amount of the meat. The degree of vacuum is below 100 torr and preferably below 50 torr.

The alkaline substance is selected from the group consisting of alkali metal and alkaline earth metal hydroxides, carbonates, hydrogencarbonates, phosphates and polyphosphates, and alkali metal and alkaline earth metal salts of organic acids. Two or more of the alkaline substances may be used. The substance may be used in the form of a solution.

Examples of the alkaline substance are sodium hydroxide, sodium carbonate, sodium hydrogencarbonate, sodium phosphate, sodium lactate, sodium tripolyphosphate, potassium hydroxide, potassium carbonate, potassium hydrogencarbonate, potassium phosphate, potassium lactate, potassium tripolyphosphate, calcium hydroxide, calcium carbonate, calcium hydrogencarbonate, calcium phosphate, calcium lactate, calcium tripolyphosphate, and so on.

The seasonings and spices can be those conventionally used in preparing "chikuwa" products.

In accordance with the invention, to the material animal meat is added an alkaline substance in an amount of 0.1 to 1.0% by weight of the amount of the meat, and the mixture is ground under a vacuum below 100 torr, so that it is possible to obtain a "chikuwa"-like food product of animal meat paste even with as high a content of water as 40 to 100% by weight of the amount of the meat material. The product obtained is superior in flavor, taste and mouthfeel and low in fact content.

DETAILED DESCRIPTION OF THE INVENTION

The invention will be described in detail by way of the following examples.

EXAMPLE 1

100 kg of pork was chopped by a chopping machine with a 6-mm thick blade, and the chopped meat was divided into two parts each consisting of 50 kg of the chopped meat. To one of the parts were added 35 liters of water, 1 (one) kg of table salt, 2.5 kg of sugar, 150 g of sodium primary phosphate, 75 g of sodium ascorbate, 500 g of sodium glutamate, 300 g of sodium hydrogencarbonate, 10 g of sodium nitrite and 100 g of potassium sorbate. The mixture was ground by a ball cutter under a vacuum of 45 torr for 10 minutes to obtain 89.6 kg of "surimi" or paste.

The mass of paste thus obtained was subjected to curing at 5° C. for 2 days and formed by means of an automatic "chikuwa"-forming machine into "chikuwa"-shaped pieces having a diameter of 3 cm and a length of 9 cm, which were baked by an electric baking machine. The yield was 85.3 kg of "chikuwa"-like pieces of pork.

COMPARATIVE EXAMPLE 1

To the other half of the above-mentioned chopped pork were added 15 liters of water, 1 (one) kg of table salt, 2.5 kg of sugar, 150 g of sodium primary phosphate, 75 g of sodium ascorbate, 500 g of sodium glutamate, 10 g of sodium nitrite and 100 g of potassium sorbate, and the mixture was ground by the ball cutter at the normal pressure for 10 minutes to obtain 69.3 kg of pork "surimi" or paste.

The "surimi" thus obtained was subjected to curing at 5° C. for 2 days and formed by means of the automatic "chikuwa"-forming machine into "chikuwa"-shaped pieces having a diameter of 3 cm and a length of 9 cm, which were baked by the electric baking machine. The yield was 65.9 kg of "chikuwa"-like pieces of pork.

Sensory tests were conducted on the products in Example 1 and Comparative Example 1 with 10 persons as panelists, and the tension strength of the products was measured by means of a rheometer made by Rheotech Co., Ltd., Japan. For the measurement of the tension strength, the product was cut into 2-cm thick annular pieces. With the plunger of the rheometer inserted into the central hole of the piece to be tested, the test piece was tensioned until it was broken, whereupon the load on the test piece just broken indicated the tension strength thereof.

The results of the sensory tests and measurement are given in Table 5.

TABLE 5

|  | Sensory test | Tension strength (g) |
| --- | --- | --- |
| Example 1 | 9 | 800 |
| Comparative example | 1 | 600 |

Nine (9) out of the 10 panelists evaluated that the product of Example 1 was superior, and the tension strength thereof was higher than the product of Comparative Example 1. While the yield in Comparative Example 1 was 65.9 kg, in Example 1 it was 85.3 kg, which was about 1.3 times that in Comparative Example 1.

EXAMPLE 2

50 kg of beef was chopped by means of the 6-mm thick blade chopping machine. To the chopped meat were added 40 liters of water, 1.5 kg of table salt, 2.5 kg of starch, 1.5 kg of gluten, 500 g of sodium glutamate, 100 g of black pepper and 200 g of sodium carbonate, and the mixture was ground by means of the ball cutter set to a vacuum of 40 torr for 10 minutes to obtain 96.3 kg of "surimi" or paste of the meat.

The paste thus obtained was formed by the automatic "chikuwa"-forming machine into "chikuwa"-shaped pieces having a diameter of 3 cm and a length of 9 cm, which were baked by the electric baking machine. The yield was 93.2 kg of "chikuwa"-like food product.

The tension strength of the product was 860 g, which was satisfactory as a "chikuwa" analog. The fat content was reduced to 50.0% of the raw material. The product was juicy and had beeflike flavor and taste.

EXAMPLES 3 TO 20

19 kg of chicken meat was chopped by the 6-mm blade chopping machine and divided into 19 masses each consisting of 1 kg of the chopped meat. 600 cc of water and 20 g of table salt were added to each of eighteen (18) of the 19 masses. Further, to the 18 masses were added sodium hydroxide (Example 3), sodium carbonate (Example 4), sodium hydrogencarbonate (Example 5), sodium phosphate (Example 6), sodium lactate (Example 7), sodium tripolyphosphate (Example 8), potassium hydroxide (Example 9), potassium carbonate (Example 10), potassium hydrogencarbonate (Example 11), potassium phosphate (Example 12), potassium lactate (Example 13), potassium tripolyphosphate (Example 14), calcium hydroxide (Example 15), calcium carbonate (Example 16), calcium hydrogencarbonate (Example 17), calcium phosphate (Example 18), calcium lactate (Example 19) and calcium tripolyphosphate (example 20), all in an amount of 3 g. Each of the 18 masses was then ground by means of the ball cutter under a vacuum of 35 torr for 10 minutes to obtain 18 masses each consisting of about 1.6 kg of chicken "surimi" or paste.

Each of the 18 masses was formed by means of the automatic "chikuwa"-forming machine into "chikuwa"-shaped pieces, which were baked by means of the baking machine to obtain about 1.5 kg of "chikuwa"-like pieces of chicken meat.

COMPARATIVE EXAMPLE 2

From the remaining 1 (one) mass of 1 (one) kg of chopped chicken meat "chikuwa"-like pieces were made in the same manner as in Examples 3 to 20 except that no alkaline substance was added to the material.

Sensory tests were conducted on the products in Examples 3 to 20 and Comparative Example 2 with 10 persons as panelists. The tension strength of the products was also measured. The results are given in Table 6, wherein the evaluation "excellent" means that all the panelists felt that the product had good flavor, taste and mouthfeel, the evaluation "good" means that 5 to 9 panelists felt that the product had good flavor, taste and mouthfeel, and the evaluation "bad" means that all the panelists felt that the product was bad as a "chikuwa" analog. The term "impossible" means that it was impossible to measure the tension strength.

TABLE 6

|  | Alkaline Substance | Evaluation | Tension strength (g) |
|---|---|---|---|
| Example 3 | Sodium hydroxide | Good | 840 |
| Example 4 | Sodium carbonate | Excellent | 860 |
| Example 5 | Sodium hydrogencarbonate | Excellent | 850 |
| Example 6 | Sodium phosphate | Excellent | 830 |
| Example 7 | Sodium lactate | Excellent | 820 |
| Example 8 | Sodium tripolyphosphate | Excellent | 830 |
| Example 9 | Potassium hydroxide | Good | 830 |
| Example 10 | Potassium carbonate | Excellent | 850 |
| Example 11 | Potassium hydrogencarbonate | Excellent | 860 |
| Example 12 | Potassium phosphate | Excellent | 870 |
| Example 13 | Potassium lactate | Excellent | 850 |
| Example 14 | Potassium tripolyphosphate | Excellent | 860 |
| Example 15 | Caicium hydroxide | Good | 790 |
| Example 16 | Calcium carbonate | Excellent | 810 |
| Example 17 | Calcium hydrogencarbonate | Excellent | 800 |
| Example 18 | Calcium phosphate | Excellent | 780 |
| Example 19 | Calcium lactate | Excellent | 760 |
| Example 20 | Calcium tripolyphosphate | Excellent | 770 |
| Control 2 |  | Bad | Impossible |

In Examples 3 through 20 it was possible to produce "chikuwa"-like products of chicken meat each having a high tension strength even with a high water content, whereas in Comparative Example 2 it was impossible to produce a "chikuwa"-like product of chicken meat.

In accordance with the invention, it is possible to produce a "chikuwa"-like product which has good flavor, taste and mouthfeel, and a high tension strength and a low fat content even with a higher water content than in the conventional product of this kind.

We claim:

1. A process for preparing a food product from poultry or animal meat, comprising:

providing a mass of chopped poultry or animal meat;

adding to said meat water in an amount of 40 to 100% by weight of the amount of said meat, an alkaline substance in an amount of 0.1 to 1.0% by weight of the amount of said meat, and a suitable amount of a seasoning and/or a spice;

grinding the mixture under a vacuum below 100 torr to obtain a mass of "surimi" of said meat;

forming said mass into pieces of a desired shape;

and heat-coagulating said pieces.

2. The process of claim 1, wherein said alkaline substance is selected from the group consisting of alkali metal hydroxides, alkaline earth metal hydroxides, alkali metal carbonates, alkaline earth metal carbonates, alkali metal hydrogencarbonates, alkaline earth metal hydrogencarbonates, alkali metal phosphates, alkaline earth metal phosphates, alkali metal polyphosphates, alkaline earth metal polyphosphates, alkali metal salts of organic acids, and alkaline earth metal salts of organic acids.

3. The process of claim 2, wherein said desired shape is the shape of "chikuwa".

4. The process of claim 1, wherein said desired shape is the shape of "chikuwa".

5. An edible material comprising: a mixture of an amount of chopped poultry or animal meat, water in an amount of 40 to 100% by weight of the amount of said meat, an alkaline substance in an amount of 0.1 to 1.0% by weight of the amount of said meat, and a suitable amount of a seasoning and/or a spice; said mixture having been ground under a vacuum below 100 torr and formed into pieces of a desired shape, which have been heat-coagulated.

6. The edible material of claim 5, wherein said alkaline substance is selected from the the group consisting of alkali metal hydroxides, alkaline earth metal hydroxides, alkali metal carbonates, alkaline earth metal carbonates, alkali metal hydrogencarbonates, alkaline earth metal hydrogencarbonates, alkali metal phosphates, alkaline earth metal phosphates, alkali metal polyphosphates, alkaline earth metal polyphosphates, alkali metal salts of organic acids, and alkaline earth metal salts of organic acids.

7. The edible material of claim 6, wherein said desired shape is the shape of "chikuwa".

8. The edible material of claim 5, wherein said desired shape is the shape of "chikuwa".

* * * * *